United States Patent
Gaschler et al.

(10) Patent No.: US 12,011,832 B2
(45) Date of Patent: Jun. 18, 2024

(54) REAL-TIME ROBOTICS CONTROL FRAMEWORK

(71) Applicant: Intrinsic Innovation LLC, Mountain View, CA (US)

(72) Inventors: Andre Gaschler, Munich (DE); Gregory J. Prisament, East Palo Alto, CA (US); Sean Alexander Cassero, Santa Rosa, CA (US); Nicholas Julian Cox, Mountain View, CA (US); Benjamin Bremer, Ottobrunn (DE); Nils Berg, Karlsruhe (DE); Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 221 days.

(21) Appl. No.: 17/245,709

(22) Filed: Apr. 30, 2021

(65) Prior Publication Data
US 2022/0347841 A1 Nov. 3, 2022

(51) Int. Cl.
*B25J 9/16* (2006.01)

(52) U.S. Cl.
CPC ........... *B25J 9/1602* (2013.01); *B25J 9/1682* (2013.01); *G05B 2219/50391* (2013.01)

(58) Field of Classification Search
CPC ...... B25J 9/1602; B25J 9/1682; B25J 9/1664; G05B 2219/50391; G05B 2219/40512
See application file for complete search history.

(56) References Cited

U.S. PATENT DOCUMENTS

| 8,260,460 B2 | 9/2012 | Sanders et al. |
| 9,981,381 B1 | 5/2018 | Nagarajan |

(Continued)

FOREIGN PATENT DOCUMENTS

| EP | 3646997 A2 | 5/2020 |
| JP | 2002187082 | 7/2002 |

(Continued)

OTHER PUBLICATIONS

International Search Report and Written Opinion in International Appln. No. PCT/US2022/026886, dated Aug. 9, 2022, 11 pages.

(Continued)

*Primary Examiner* — Adam R Mott
*Assistant Examiner* — Matthew C Gammon
(74) *Attorney, Agent, or Firm* — Fish & Richardson P.C.

(57) ABSTRACT

Methods, systems, and apparatus, including computer programs encoded on computer storage media, for controlling a robot to perform a custom real-time action that uses a callback function. One of the methods comprises receiving a definition of a custom real-time control function that specifies a custom callback function, an action, and a custom reaction that references the custom callback function; providing a command to initiate the action; repeatedly executing, by the control layer of the real-time robotics control framework, the custom real-time control function at each tick of a real-time robotics system driving one or more physical robots, including: obtaining current values of one or more state variables, evaluating the custom reaction specified by the custom real-time control function according to the current values of the one or more state variables, and whenever the one or more conditions of the custom reaction are satisfied, invoking the custom callback function.

15 Claims, 8 Drawing Sheets

(56) References Cited

U.S. PATENT DOCUMENTS

| | | |
|---|---|---|
| 2004/0128671 A1 | 7/2004 | Koller et al. |
| 2007/0208442 A1 | 9/2007 | Perrone |
| 2009/0254217 A1 | 10/2009 | Pack et al. |
| 2011/0071676 A1 | 3/2011 | Sanders et al. |
| 2012/0010772 A1* | 1/2012 | Pack .................. G05D 1/0088 701/27 |
| 2018/0229367 A1 | 8/2018 | Lee et al. |
| 2020/0001471 A1* | 1/2020 | Chen ..................... B25J 13/081 |
| 2020/0070346 A1 | 3/2020 | Oaki |
| 2020/0233436 A1 | 7/2020 | Fox et al. |
| 2020/0276707 A1 | 9/2020 | Go et al. |
| 2021/0370504 A1 | 12/2021 | Beardsworth et al. |
| 2022/0063091 A1 | 3/2022 | Hasunuma et al. |
| 2022/0314434 A1 | 10/2022 | Kranski et al. |
| 2022/0347844 A1 | 11/2022 | Gaschler et al. |
| 2022/0347846 A1 | 11/2022 | Gaschler et al. |

FOREIGN PATENT DOCUMENTS

| | | |
|---|---|---|
| KR | 1020130017698 | 2/2013 |
| KR | 1020170034754 | 3/2017 |

OTHER PUBLICATIONS

International Search Report and Written Opinion in International Appln. No. PCT/US2022/026893, dated Aug. 16, 2022, 10 pages.
International Search Report and Written Opinion in International Appln. No. PCT/US2022/026894, dated Aug. 9, 2022, 10 pages.
Silva et al., "Implementing a distributed sensing and actuation system: the CAM BADA robots case study," 2005 IEEE Conference on Emerging Technologies and Factory Automation, Sep. 19-22, 2005, 8 pages.

* cited by examiner

REAL-TIME ROBOTICS CONTROL FRAMEWORK

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

Due to such timing requirements, software control systems for physical machines are often implemented by closed software modules that are configured specifically for highly-specialized tasks. For example, a robot that picks components for placement on a printed circuit board can be controlled by a closed software system that controls each of the low-level picking and placing actions.

SUMMARY

This specification describes a real-time robotics control framework that provides a unified platform for achieving multiple new capabilities for custom real-time control. As one example, the techniques described in this specification allow a user to define custom real-time reactions for one or more physical robots. As another example, the techniques described in this specification allow the custom real-time reaction to trigger a callback to a non-real-time function, e.g., an application-level control function, responsive to external stimuli detected in real-time while real-time operation of the robots continues. As yet another example, the techniques described in this specification allow for custom real-time handling of streaming inputs. Streaming inputs are real-time inputs that may arrive at varying rates or non-deterministically or both. In addition, in some such examples, the techniques described in this specification provide a framework through which a user can define custom real-time control code, custom callback code, custom streaming control code, or a combination thereof.

In this specification, a framework is a software system that allows a user to provide higher level program definitions while implementing the lower level control functionality of a real-time robotics system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, e.g., at the order of one millisecond.

Particular embodiments of the subject matter described in this specification can be implemented so as to realize one or more of the following advantages.

Some existing robotics application frameworks dictate the interface of the devices and software modules, and do not allow a user to customize the interfaces for a particular use case, much less a real-time, custom use case. Some systems described in this application allow a user to compose custom software modules that facilitate custom action execution by one or more robots that fit their needs; users can also formulate the data interfaces of the constituent software modules of a real-time robotics control framework. Some such software modules can then be deployed in a control system that allows real-time control of the custom actions while additionally supporting asynchronous programming or streaming inputs or both. A real-time control system is a software system that is required to perform actions within strict timing requirements in order to achieve normal operation.

Under the design of the disclosed real-time robotics control framework, the custom software modules allow a robot to incorporate both real-time sensor information and custom control logic, even in a hard real-time system. Using custom software modules can, in some cases, provide additional capabilities for the robot to react in a more natural and fluid way, which results in higher precision movements, shorter cycle times, and more reliability when completing a particular task. Using custom software modules can also facilitate easy integration with specific robot hardware through a hardware abstraction layer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
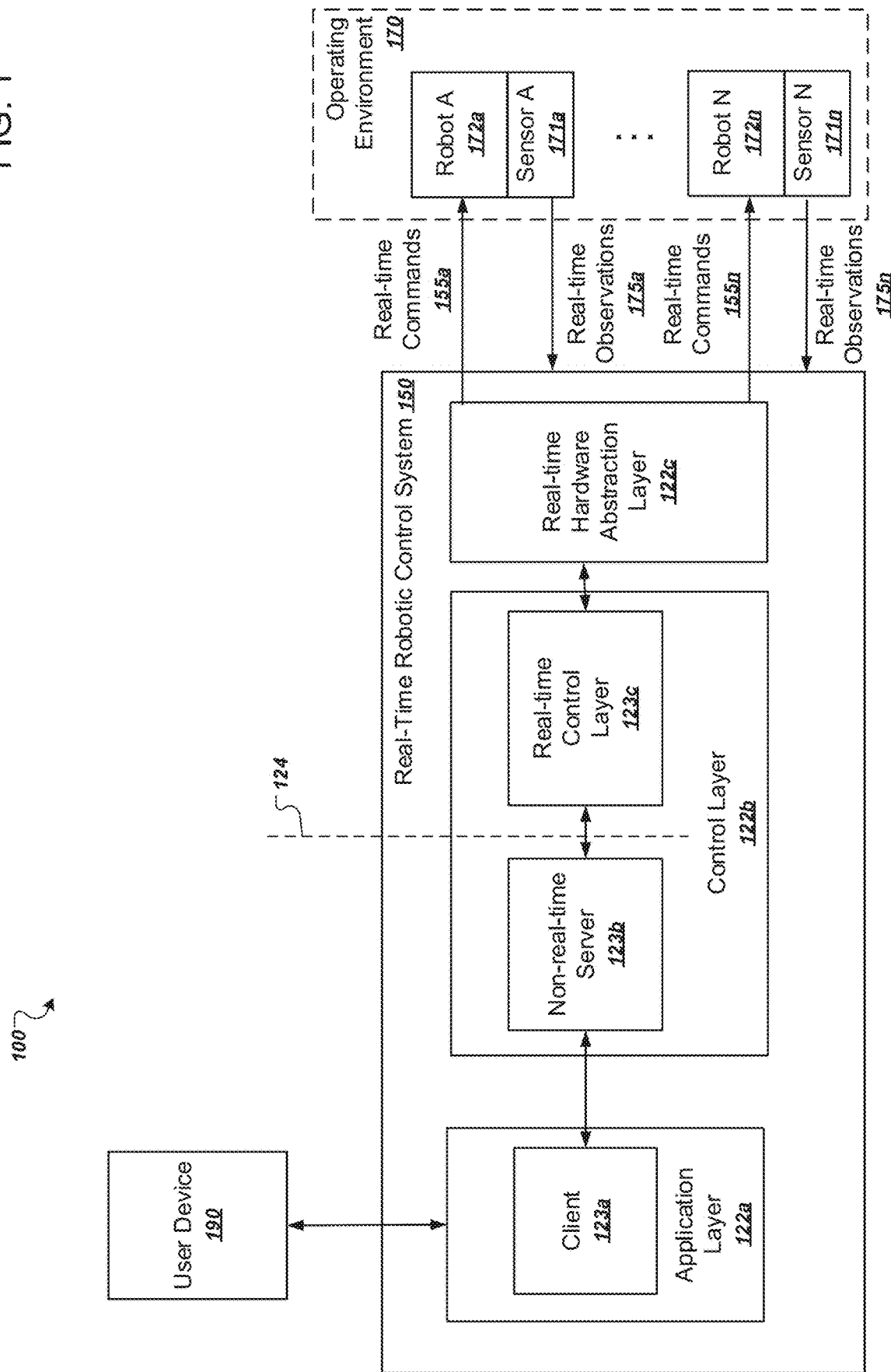
FIG. 1 is a diagram of an example system.

FIG. 1 is a diagram of an example system 100. The system 100 includes a real-time robotic control system 150 to drive multiple robots 172a-n in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotics control framework as described in this specification. In particular, the system 100 can provide a unified framework that allows users to achieve multiple different types of custom real-time control while simultaneously supporting asynchronous programming or streaming inputs or both. In this specification, a robotic control system being described as being real-time means that is required to execute within strict timing requirements to achieve normal operation. The timing requirements often specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

In this specification, real-time control being custom means that a user can specify how robots in a workcell should act or react at each tick of a real-time control cycle. An action refers to a motion having precomputed motion parameters, such as moving a tool on a robot arm from point A to point B. A reaction refers to a real-time switch between actions due to certain specified conditions, which can include sensor data that is updated in real-time. In addition, the system 100 allows users to specify custom real-time control code that is executed to recompute motion parameters on the fly at each tick of the real-time control cycle, as opposed to issuing low-level commands according to precomputed motion parameters.

An advantage of the framework provided by the system 100 is that it can allow users to specify such custom real-time control information with relatively small amounts of user code, which can be expressed in high-level programming languages, e.g., Object Oriented Programming (OOP) languages, including C++, Python, Lua, and Go, to name just a few examples. This capability for providing high-level, custom real-time control is vastly easier and more powerful than programming robot movements using only low-level commands that relate to joint angles or levels of electrical current.

A user of the system 100 can initiate the execution of custom real-time control by providing custom real-time control code to the real-time robotic control system 150. For example, a user can use a user device 190 to provide custom real-time control code to the application layer 122a. The user device 190 can for example execute an integrated development environment (IDE) that is compatible with the real-time robotic control system 150. An IDE is a software suite providing tools facilitating users to write and, optionally, test software for deployment in the real-time robotic control system 150. A user can develop custom software applications in an editor of the IDE. For example, the user can write code, e.g., class, object, or method instances that are required to facilitate the real-time control of the one or more robots to perform a custom action. The system can also prompt the user to write code for different software modules, or different components of a single software module, to be included in the control stack 122. For example, the user interface subsystem 190 can generate a user interface presentation that prompts or guides the user to write code for different class, object, or method instances that, once deployed, constitute the respective software modules included in the control stack 122.

A class is a combination of methods and data that are encapsulated in a file that defines how data are stored and accessed. A class may form a template from which instances of running code may be created or instantiated. An object or code object is code that may be interpreted, compiled, or both. An object may be an example of a class once instantiated for a specific purpose.

The real-time robotic control system 150 can then prepare the custom real-time control code for execution. Different portions of the custom real-time control code can be executed in different layers of the control stack, e.g., in the client 123a, the non-real-time server 123b, the real-time control layer 123c, or some combination of these.

Generally, the control stack of the real-time robotic control system 150 follows a client-server model in which a client 123a provides commands to the non-real-time server 123b, which handles passing commands over a boundary 124 between real-time and non-real-time code. The non-real-time server 123b may execute on a common computer with the client 123a, or operate on a different computer. As described above, this arrangement allows the non-real-time server 123b to implement custom real-time reactions that cause the real-time control layer 123c to switch execution of actions in real time. Thus, the real-time server 123b can be responsible for determining at which control cycle the real-time reaction should occur.

The real-time robotic control system 150 is then configured to control the robots 172a-n in the operating environment 170 according to the custom real-time control code. To control the robots 170a-n in the operating environment 170, the real-time robotic control system 150 provides commands, e.g., commands 155a-n, to be executed by one or more robots, e.g., robots 172a-n, in the operating environment 170. In order to compute the commands 155, the real-time robotic control system 150 consumes observations 175a-n made by one or more sensors 171a-n gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

The real-time robotic control system 150 can provide commands through a control stack 122 that handles providing real-time control commands 155 to the robots 172a-n. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122c, and the highest level is the application layer 122a. Some of the software modules 122a-c can be high-level software modules composed of one or more lower-level software modules and a data interface, generated by the user using the lower-level software modules. That is, a custom high-level software module can depend on one or more low-level software modules.

The control stack 122 ultimately drives robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command 155 indicating an amount of torque that should be applied. In response to receiving the command, the motor can report a status message specifying a current position of a joint of the robot, e.g., using an encoder, to a higher level of the software stack. As another example, the control stack 122 can directly receive observations generated by one or more sensors in the operating environment 170, which may or may not be physically coupled to the robot 172. For example, the observation can include image data generated by an arm-mounted camera or a wall-mounted camera.

Typically, the commands and status messages are generated cyclically during each control cycle, e.g., one status message and one command per control cycle. Lower levels of the software stack generally have tighter time requirements than higher levels of the software stack. At the lowest levels of the software stack, for example, the control cycle can have actual real-time requirements.

In some implementations, the application layer 122a can provide target trajectory information for a robot component. In the case of custom real-time control code, the target trajectory information can be based on status messages generated by other software modules in the control stack 122, real-time observations 175, or both. The trajectory information includes at least a trajectory set point ("goal state") for a robot component and optionally other metadata. A goal state can include for each moment in a particular time period, one or more of a position, a velocity, or an acceleration for the robot component. The trajectory generated by the application layer 122a may be in Cartesian-space or joint-space coordinates.

The trajectory information can be consumed by the real-time control layer 123c, which use the trajectory information to produce continuous real-time control signals including, e.g., real-time positions, velocities, or torques for a robot component such as a robot joint, which determine how to drive the motors and actuators of the robots 172a-n in order to follow the target trajectory. The continuous real-time control signals can then be consumed by the hardware abstraction layer 122c. The hardware abstraction layer 122c can include software module, e.g., a real-time controller module, that interfaces the robot 172a-n, e.g., by issuing real-time commands 155a-n to drive the movements of the moveable components such as joints of the robots 172a-n in the operating environment 170 to follow the target trajectory.

Real-time controllers generally have parameters that determine how the robots controlled by the controller are driven along the target trajectory. The behavior of the robotic system is hence determined not only by the trajectory information but also the control parameters. Different tasks may require or benefit from different control parameters, and those control parameters may also need to vary during the task for best performance. In this specification, a control parameter is a value that specifies how a real-time controller will cause a robot component to move in order to follow the trajectory.

The specifics of timing constraints and the flexibility related to timing windows are generally configurable aspects of the real-time robotic control system 150 that can be tailored for the task being performed. In an example system, the real-time requirements of the system 150 require that the hardware abstraction layer 122c provide a command at a first rate (or frequency), e.g., every 5, 10, or 20 milliseconds, while the non-real-time requirements of the system 150 specify that the control layer 122b should provide a command to the hardware abstraction layer 122c at a second rate that is often lower than the first rate, e.g., every 25, 50, or 100 milliseconds. In addition, the rates need not be fixed. For example, the hardware abstraction layer 122c can provide a command at a fixed rate, while the application layer 122a can provide a command at a varying rate or a rate that is sporadic.

To bridge the boundary between the non-real-time commands generated by upper-level software modules in the control stack 122 and the real-time commands generated by the lower-level software modules in the control stack 122, the real-time robotic control system 150 can use the control layer 122b which, in turn, can include both a real-time control layer 123c and a non-real-time server 123b that collectively facilitate real-time control of a custom action from commands issued by the client 123a. The control layer 122b serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command. For each custom real-time action, some of all of the constituent software modules of the control layer 122b, including constituent software modules of the real-time control module within the control layer 122b, may be developed by a user. Once developed, the constituent software modules may be provided in the form of one or more application programming interfaces (APIs) and may orchestrate with those within the application module 122b to facilitate custom real-time control of the robots.

A first type of custom real-time control is a custom real-time action. A user can define a custom real-time action by specifying a set of movement parameters. The movement parameters can be precomputed, which means that they can be generated before the action is defined, for example, as computed by a cloud-based motion planner. The client can provide the definition of the custom real-time action to the non-real-time server 123b, which can then initialize all the motion parameters and other state variables for real-time execution. For example, the non-real-time server 123b can preallocate memory and perform data format conversions between non-real-time data formats and real-time data formats. The client can then provide a start command to the non-real-time server 123b, which kicks off execution of the custom real-time action.

A second type of custom real-time control is a custom real-time reaction. A custom real-time reaction defines a real-time transition between two real-time actions according to one or more conditions. As an example, two movement actions can be chained together by associating a first action with a reaction condition that represents the end of the first action. When the condition is satisfied, the real-time control layer will automatically and in real time switch to performing the second action. In other words, the real-time control layer need not wait for confirmation or an instruction from a higher-level controller to begin execution of the second action. These mechanisms also allow the user to easily define powerful and complex state machines of actions, whose transitions are executed in real-time.

Another powerful feature of the framework described in this specification is the integration of real-time sensor data into the mechanisms of custom real-time control. One way of doing this is to have the conditions associated with custom real-time reactions depend on sensor data. For example, a user can define a custom real-time reaction that changes the admittance control of a robot arm when the arm comes in contact with a surface. To do so, the user can define a condition based on a force sensor such that when the force as measured by the force sensor exceeds a particular threshold, the real-time control layer can automatically and in real-time switch execution to a different action.

Another type of custom control is a custom real-time control code. Unlike the code defining custom actions and custom reactions, custom real-time control code is generally executed by the real-time control layer itself in order to compute the motion parameters for driving robots in the operating environment. This arrangement provides another mechanism for integrating real-time sensor data into custom real-time control. For example, a user can define the custom real-time control code to remain a particular distance, e.g., 0.5 mm, above a surface when performing a welding or gluing task. Both the actual current distance of the tool from the surface, and the motion parameters for adjusting the distance can be computed in real-time according to the user's custom real-time control code.

Another powerful feature of the framework described in this specification is the integration of asynchronous programming into the mechanisms of custom real-time control. This allows a user to write relatively small amounts of code, e.g., in C++, Python, Lua, or Go, that defines one or more concise callback functions at the application layer 122a to react to events that are detected in real-time, e.g., while the robots 172a-n are in operation. Synchronous programming is straightforward. When a call to a function is made, a calling thread is blocked and waits until the function is completed before been unblocked. By contrast, in asynchronous programming, a calling thread that initiates an asynchronous call to a function is not blocked and can perform other processing, thereby allowing an ongoing work to continue or other additional work to be performed while a computation is executed. Upon completed execution, the calling thread can be notified of the results by way of the callback.

A callback function is a pointer to the executable code that is passed as an argument to another function. The callback function can be code, that when executed by the system 150, handles an event. Accordingly, a callback function can be used to notify the client 123a that an event has occurred. In a generic sense, an event is a message or signal that is sent when a situation occurs. For example, such events may include a change in the configuration of the robots 172a-n, or a change in the layout of the operating environment 170, which may be observed by using the sensors 171a-n.

More specifically, the framework can allow for a custom real-time reaction in the control layer 122b that is running in a real-time thread to invoke an application layer-level control function that executes some functionality and returns a result to the custom real-time reaction. Moreover, by implementing asynchronous operations in the framework, the control layer 122b do not wait or block for a response from before continuing real-time robot control execution as would have been done with synchronous operations. Rather, the real-time thread that controls the robot operation continues and is able to accept the result from the application layer-level control function at any time. Consequently, the framework provides the real-time robotics control system 150 with capability to support additional tasks, including time intensive tasks that involve controlling a different component of the operating environment or interfacing with a different system, while ensuring the custom real-time control of the robots 172a-n.

A further powerful feature of the framework described in this specification is the integration of streaming inputs into the mechanisms of custom real-time control. In other words, the framework facilitates custom, real-time handling of streaming inputs. Streaming inputs are inputs to the control layer that may arrive at varying rates or non-deterministically, e.g., with incomplete information, or both. For example, the client 123a, when executing some computationally expensive control functionality such as a machine-learned control algorithm, may generate and provide streaming control commands to the control layer 122b.

To handle gaps between streaming inputs, the real-time robotic control system 150 can run a real-time streaming control function at the non-real-time server 123b. For example, the real-time streaming control function can implement some data interpolation or extrapolation logic that generates interpolated or extrapolated control parameter information that specifies a goal state for a robot, e.g., in terms of position, velocity, acceleration, joint angle, or a combination thereof of the robot. Each interpolated or extrapolated control parameter may have a defined range of possible values that the robot can assume. For example, the real-time streaming control function can generate control parameter values at each point in time during a time period, or as a series of computed control parameter values. The interpolated control parameters are used by the hardware abstraction layer 122c for effectuating the real-time guarantees of the system, e.g., for driving the robots 172a-n along the trajectory generated by the client 123a. This makes it feasible to run some high-level control functionality that is computationally expensive in the real-time robotic control system 150 for use in controlling the robots 172a-n. This is also very unlike traditional robot control systems, where the control parameters are typically set once at setup of the robot installation and then never changed again.

The framework similarly allows a user to write and provide code that defines a custom real-time streaming control function, thereby explicitly defining how to handle gaps between streaming inputs. Alternatively or additionally, the framework allows a user to select, e.g., as a user-selected interpolation function to compute goal states, from a library of pre-defined real-time streaming control functions provided by the framework to handle such gaps.

Figure 2:
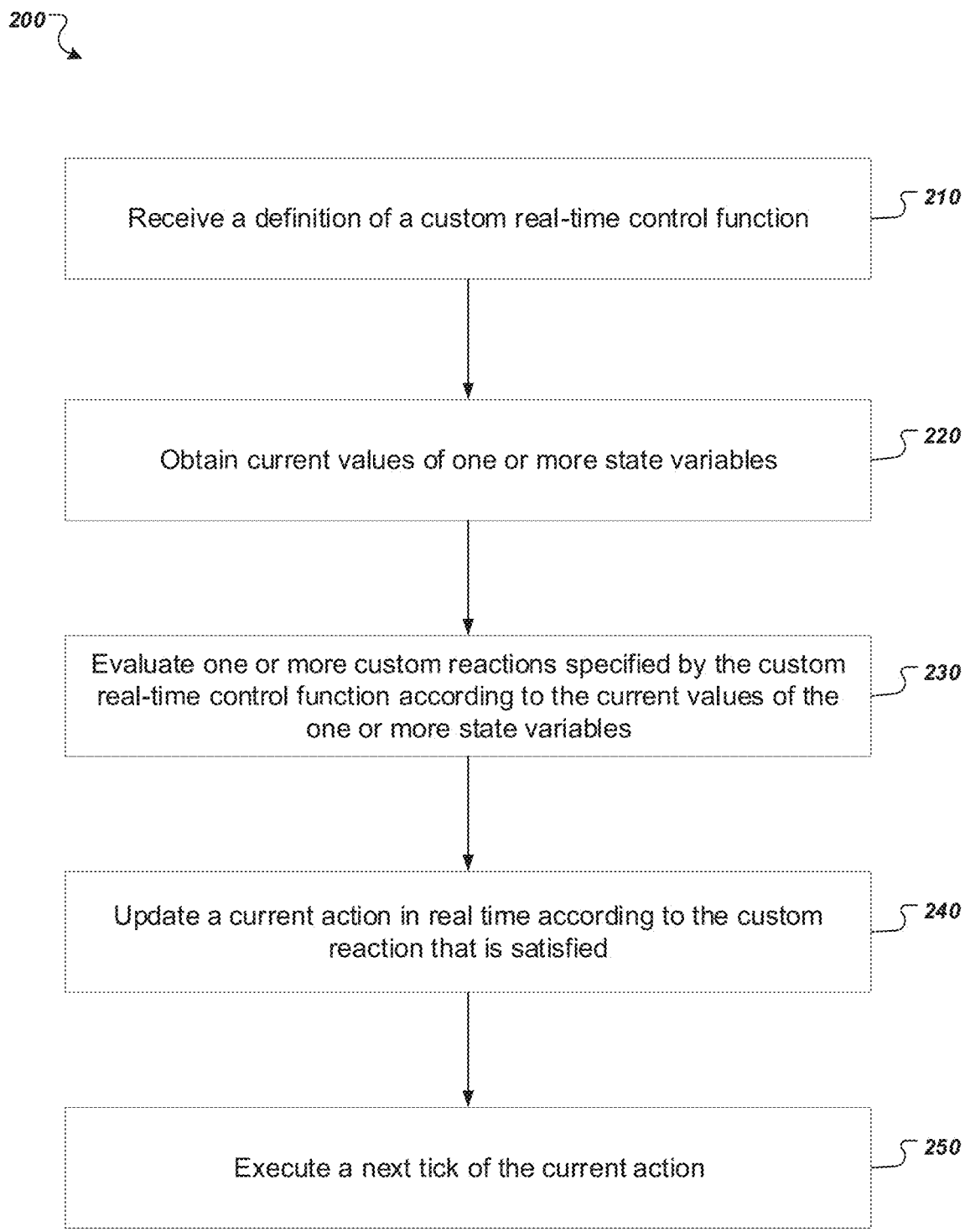
FIG. 2 is a flowchart of an example process for executing a custom real-time reaction.

FIG. 2 is a flowchart of an example process for executing a custom real-time reaction. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

As described above, the system runs a real-time robotics control framework that is composed of a stack of multiple software modules which can be executed repeatedly in a predetermined sequence in order to control one or more robots. One of such software modules is a bridging module in the control stack that translates each non-real-time command into data that can be consumed by real-time controllers that are responsible for generating low-level real-time commands to control the one or more robots to perform a custom action.

The system receives a definition of a custom real-time control function (210). The custom real-time control function specifies a sequence of actions to be executed with deterministic timing and one or more custom reactions that chain the sequence of actions. To chain the sequence of actions, each custom reaction can include one or more conditions for real-time switching between a pair of actions in the plurality of actions, i.e., real-time switching between completion of a first action and the beginning of a second action of the robot. The reaction itself can also be a custom reaction that is user-defined.

The custom real-time control function can be provided by a different entity than an entity running or providing the real-time robotics control framework. For example, the real-time robotics control framework can be pre-configured by the manufacturer of the robot, or by an entity responsible for setting up the robot installation, or by an entity who owns and operates the robot installation. In other words, the real-time robotics control framework allows users to easily supply their own real-time control of the robot installation without relying on the robot manufacturer or the entity who initially set up the installation.

The custom real-time control function can be provided at a number of different times. In some cases, a custom real-time control function can be provided at compile time so that the code is compiled into the software of the real-time control layer. Alternatively or in addition, the custom real-time control function can be provided dynamically at run time at the real-time control layer, e.g. as a plugin, and a user of the system can provide the definition by supplying a custom configuration of the custom real-time control function.

In some cases, a user of the system that controls the one or more robots can design a real-time state machine by defining custom actions and custom reactions for the robots, and the definition of the custom real-time control function can be provided by the user in the form of the real-time state machine of actions that are related by custom reactions.

In this specification, a real-time state machine is a representation of the operational transitions to be performed by a robot. A real-time state machine includes nodes and edges, where each node represents a real-time state of the robot or a set of actions that the robot can execute, and each edge between a first node and a second node represents one or more "switching conditions" that, if satisfied, cause the robot to transition from executing the actions represented by the first node to executing the actions represented by the second node. Thus, when the system is in a particular node of the real-time state machine, the system is sending real-time commands to drive the robot to execute the actions represented by the particular node, while continuously monitoring the switching conditions of the node. Whenever one of the switching conditions are met, the system can transition to a different node of the real-time state machine by sending different real-time commands to cause the robot to be in a state represented by the different node of the real-time state machine.

TABLE 1 includes an example of user code written to define and start a custom real-time action.

TABLE 1

| 1 | client.start_session ( ) |
| 2 | action = session.add_action ( |
| 3 | action_id=0, |
| 4 | action_type="point_to_point_move" , |
| 5 | params=move_params, |
| 6 | reactions= [ ] ) |
| 7 | session.start_action (action_id=action.id) |

The example user code can be executed by the client of a real-time robotic control system using a set of precomputed movement parameters.

On line 1, the client initiates a session with a non-real-time server.

On line 2, an action is defined. The action definition includes an id (line 3), a type (line 4), and movement parameters (line 5). Line 6 shows that there are no reactions associated with this action, and thus when executed, the system will simply execute it as a one-off real-time action and end execution thereafter.

On line 7, the client kicks off the real-time action by sending a command to the non-real-time server, referencing the action id. The control layer of the system will then initialize the real-time environment and execute the action accordingly.

TABLE 2 includes an example of user code to define a custom real-time reaction.

TABLE 2

| 1 | done_signal = robot_control.NewSignalFlag ( ) |
| 2 | action0 = robot_control.Action ( |
| 3 | action_id=0, |
| 4 | action_type='point_to_point_move' , |
| 5 | params=move_params_0, |
| 6 | reactions= [ |
| 7 | robot_control.Reaction ( |
| 8 | condition=robot_control.is_done ( ) , |
| 9 | responses= [ |
| 10 | StartAction (action_id=1) ] ) |
| 11 | ] ) |
| 12 | |
| 13 | action1 = robot_control.Action ( |
| 14 | action_id=1, |
| 15 | action_type='point_to_point_move' , |
| 16 | params=move_params_1, |
| 17 | reactions= [ |
| 18 | robot_control.Reaction ( |
| 19 | condition=robot_control.is_done ( ), |
| 20 | responses= [ |
| 21 | robot_control.Signal (done_signal) , |
| 22 | ] ) |
| 23 | ] ) |
| 24 | |
| 25 | session.add_action_instances ( [action0, action1] ) |
| 26 | |
| 27 | # Starts the sequence action0 => action1. |
| 28 | session.start_action (action0.id) |
| 29 | |
| 30 | # Wait for the sequence to end. |
| 31 | done_signal.wait ( ) |

On lines 2 and 13, two respective actions are defined. Unlike the example in TABLE 1, however, each action has an associated reaction.

As shown on lines 7-10, the first action has a reaction that specifies a condition and a response. In this case, the condition is simply whether or not the action is done according to a control signal indicating that the action has completed.

To chain the actions together, the associated response is to kick off the second action having action_id of 1, as shown on line 10.

The other action, action1, also has a similar associated reaction defined on lines 18-21. The response, however, is simply to generate a signal that the sequence of actions has completed.

On line 31, the client application can use this signal to wait until the sequence has completed.

TABLE 3 includes an example of user code to define a state machine that integrates real-time sensor feedback. This example moves a robot end effector up or down repeatedly for 30 seconds, based on the readings of a distance sensor ("rangefinder" sensor). The two states, "moving up" and "moving down," are represented as actions action0 and action1, respectively.

TABLE 3

| | |
|---|---|
| 1 | move_params0 = |
| 2 | VelocityMoveWithRangefinderFixedParams ( ) |
| 3 | |
| 4 | # set goal velocity towards the ground |
| 5 | move_params0.goal_velocity.z = −0.25 |
| 6 | |
| 7 | move_params1 = |
| 8 | VelocityMoveWithRangefinderFixedParams ( ) |
| 9 | |
| 10 | # set goal velocity towards the ceiling |
| 11 | move_params1.goal_velocity.z = 0.25 |
| 12 | |
| 13 | action0 = robot_control.Action ( |
| 14 | action_id=0, |
| 15 | action_type='velocity_move_with_rangefinder' , |
| 16 | params=move_params_0, |
| 17 | reactions= [ |
| 18 | robot_control.Reaction ( |
| 19 | condition= |
| 20 | is_less_than("rangefinder_distance" , |
| 21 | 0.5) , |
| 22 | responses= [ |
| 23 | StartActionInRealTime (start_action_id=1) , |
| 24 | ] ) |
| 25 | ] ) |
| 26 | |
| 27 | action1 = robot_control.Action ( |
| 28 | action_id=0, |
| 29 | action_type='velocity_move_with_rangefinder' , |
| 30 | params=move_params_0, |
| 31 | reactions= [ |
| 32 | robot_control.Reaction ( |
| 33 | condition= |
| 34 | is_less_than ("rangefinder_distance" , |
| 35 | 2.0) , |
| 36 | responses= [ |
| 37 | StartActionInRealTime (start_action_id=0) , |
| 38 | ] ) |
| 39 | ] ) |
| 40 | |
| 41 | session.add_action_instances ( [action0, action1] ) |
| 42 | |
| 43 | # Starts the real-time state machine |
| 44 | session.start_action (action0.id) |
| 45 | |
| 46 | # Waits for 30 seconds to elapse |
| 47 | time.sleep (30) |

In this example, the conditions associated with the reactions use real-time sensor input, which in this client-side code is referenced by a variable having a name "rangefinder_distance." When the real-time robotic control system prepares the custom real-time control code for execution, the system can automatically update instances of the variable name with corresponding memory locations where the results of the rangefinder sensor are automatically updated in real-time.

In this case, the first state of the state machine is represented by action 1, in which the end effector is moving down. At every tick of the real-time control cycle, the system can check any conditions associated with the currently executing action. The action continues if none of the reaction conditions are satisfied, in which case at each tick the system moves the end effector according to the movement parameters generated by the function VelocityMoveWithRangefinderFixedParams( ) on lines 2 and 8. In this case, both actions have the same position motion parameters but different goal velocities.

During execution, the system can run the software applications corresponding to the example code snippets shown above to compute, in real-time, the control parameters associated with controlling the robots to perform the custom real-time actions. The system can then send the computed control parameters to other relevant modules within the system (e.g., the real-time software control modules running at the server) to be executed in real-time.

Figure 3:
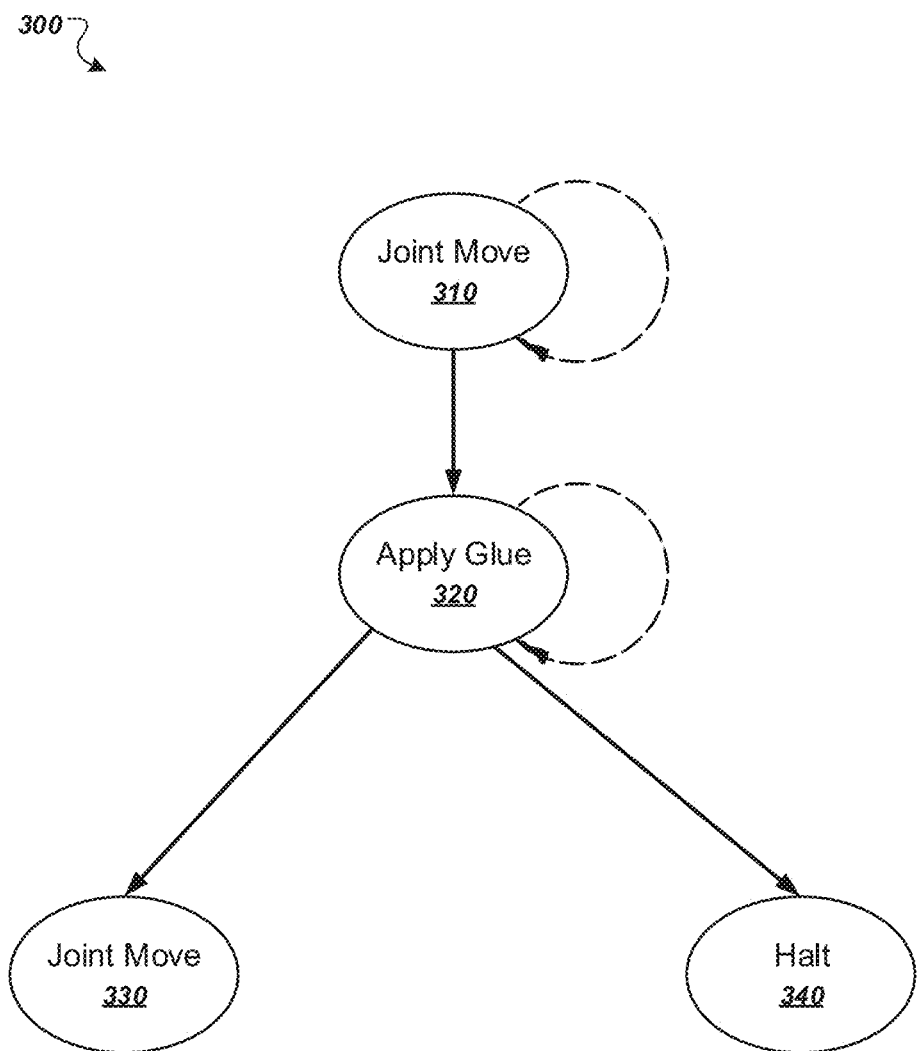
FIG. 3 illustrates an example of a real-time state machine of actions that are related by custom real-time reactions.

FIG. 3 illustrates an example of a real-time state machine of actions that are related by custom real-time reactions. In FIG. 3, a robot has been assigned to perform a gluing task to apply glue on a target object in an operating environment, e.g., in a workcell.

The example real-time state machine 300 illustrated in FIG. 3 begins with a joint move action 310 by the robot. While executing the joint move action 310, the system evaluates whether a condition associated with a reaction for the joint move action 310 is satisfied. Each action can be associated with multiple reactions, each with one or more conditions. Thus, at each control tick, the system can evaluate the conditions associated with all reactions for the currently executing action. In order to improve latency, in some implementations the system need not consider whether conditions for reactions of other actions that are not executing have been satisfied. In other words, the system can consider only conditions for reactions associated with the currently executing action.

As described above, evaluating the conditions can consume real-time sensor data. Thus, a common pattern is for the system to determine, during a joint move action, whether a robot has attained a particular position or pose. In this case, the system can for example use a condition to determine whether the robot has reached the point at which gluing is to start.

If the condition for the reaction is satisfied, the system transitions in real-time to the next according to the state machine defined in the user's custom real-time reaction code. Thus, the system can transition in real-time to the apply glue action 320. Importantly, the system need not evaluate a high level plan or spend time computing the next action. All real-time transitions between actions are explicitly specified by the user's custom real-time reaction code, which allows for highly reliable real-time switching between actions.

If a condition for a reaction is not satisfied, the system performs the next control tick for the current action. Thus, when the actions and reactions are used to define a state machine, there is an implicit loop back transition (illustrated in dashed lines) whenever a condition associated with a reaction is not satisfied.

In this example, the conditions for determining whether the reaction is satisfied can include determining whether the robot has got into a position for gluing, whether clamps have closed down on the target object to secure it for gluing, or both.

If the reaction is satisfied, the system can update the current action to a glue action 320 and, correspondingly, control the robot to perform the action of applying glue on the target object. However, the glue action 320 cannot happen until the robot has got into the position for gluing, until the clamps are closed, or both.

From the apply glue action 320, the real-time state machine 300 can have two reactions, where a first reaction is finish performing the apply glue action 320 and transition into a joint move action 340, and a second reaction is finish performing the apply glue action 520 and transition into a halt action 340. For example, the conditions for determining whether the first reaction is satisfied can include determining whether the apply glue action 320 has been performed for a predetermined period of time, whether the clamps are open, or both. And the conditions for determining whether the second reaction is satisfied can include determining whether a human is detected to be in a close proximity to the robot during the apply glue action 320. Then, when a reaction is satisfied, the system can transition into either the joint move action 330 to begin moving away from the target object, or to the halt action 340, i.e., "freeze" the ongoing apply glue action 320.

Referring back to FIG. 2, the system repeatedly executes the custom real-time control function at each predetermined control tick of the real-time robotic control system driving one or more physical robots. For example, the system can repeatedly execute the custom real-time control function at each control tick of the system in accordance with a control schedule that has been determined in advance, e.g., following the commencement of the execution of the real-time control function. In brief, this involves obtaining current values of one or more state variables (220), evaluating one or more custom reactions specified by the custom real-time control function according to the current values of the one or more state variables (230) and, whenever a custom reaction is satisfied: updating a current action in real time according to the custom reaction that is satisfied (240), and executing a next tick of the current action (250).

Some or all of the custom reactions as specified in the custom definition of the custom real-time control function may use sensor inputs in real time. Thus, during execution of the custom real-time control function, the system repeatedly obtains one or more sensor values generated by one or more sensors in the operating environment of the one or more robots. For example, the sensors can include distance sensors, force sensors, torque sensors, or cameras making observations within the operating environment.

The system can determine whether a custom reaction is satisfied by the one or more sensor values generated from sensors in the operating environment. In response to a positive determination, the system subsequently executes a real-time switch between a first real-time action and a second real-time action. In some implementations, whenever the custom reaction is satisfied, the system also obtains new sensor values to be used by the updated current action.

The system obtains current values of one or more state variables (220) while executing a current action. The state variable can generally include sensor values or information derived from the sensor values or both.

In the example of FIG. 3, when the system is at the joint move action 310, to determine whether the reaction of transitioning into the apply glue action 320 is satisfied, the system can obtain sensor values including distance readings generated by the distance sensors or camera images generated by the cameras and then use the sensor values to determine whether the robot has got into the position for gluing, whether the clamps have closed down on the target object to secure it for gluing, or both.

The system evaluates the one or more custom reactions specified by the custom real-time control function according to the current values of the one or more state variables (230).

In some implementations, to determine whether a custom reaction is satisfied, the system can evaluate all of the custom reactions specified by the custom real-time control function. In other implementations, the system can evaluate only the custom reactions that are associated with the current action. In the example of FIG. 3, when the system is at the joint move action 310, only the reaction to transition into the apply glue action 320, rather than other reactions to transition into the joint move action 330 or the halt action 340, may be evaluated by the system.

Whenever a custom reaction is satisfied, the system updates a current action in real time, i.e., within the current control tick, according to the custom reaction that is satisfied (240). Optionally, the system also obtains new sensor values to be used by the updated current action. In FIG. 3, for example, the conditions for real-time switching between the apply glue action 320 and joint move action 330 may be a predetermined thickness of glue having been applied on the target object and, in response to a positive determination by evaluating the reaction according to the current values of the state variables relating to the glue thickness, the system can stop performing the apply glue action 320 and to transition to the joint move action 330 to begin moving away from the target object.

Alternatively, if no custom reaction is satisfied, the system continues to execute a next control tick of the current action (250). That is, the process 200 returns to step 220 where the system obtains new values of the one or more state variables.

Figure 4:
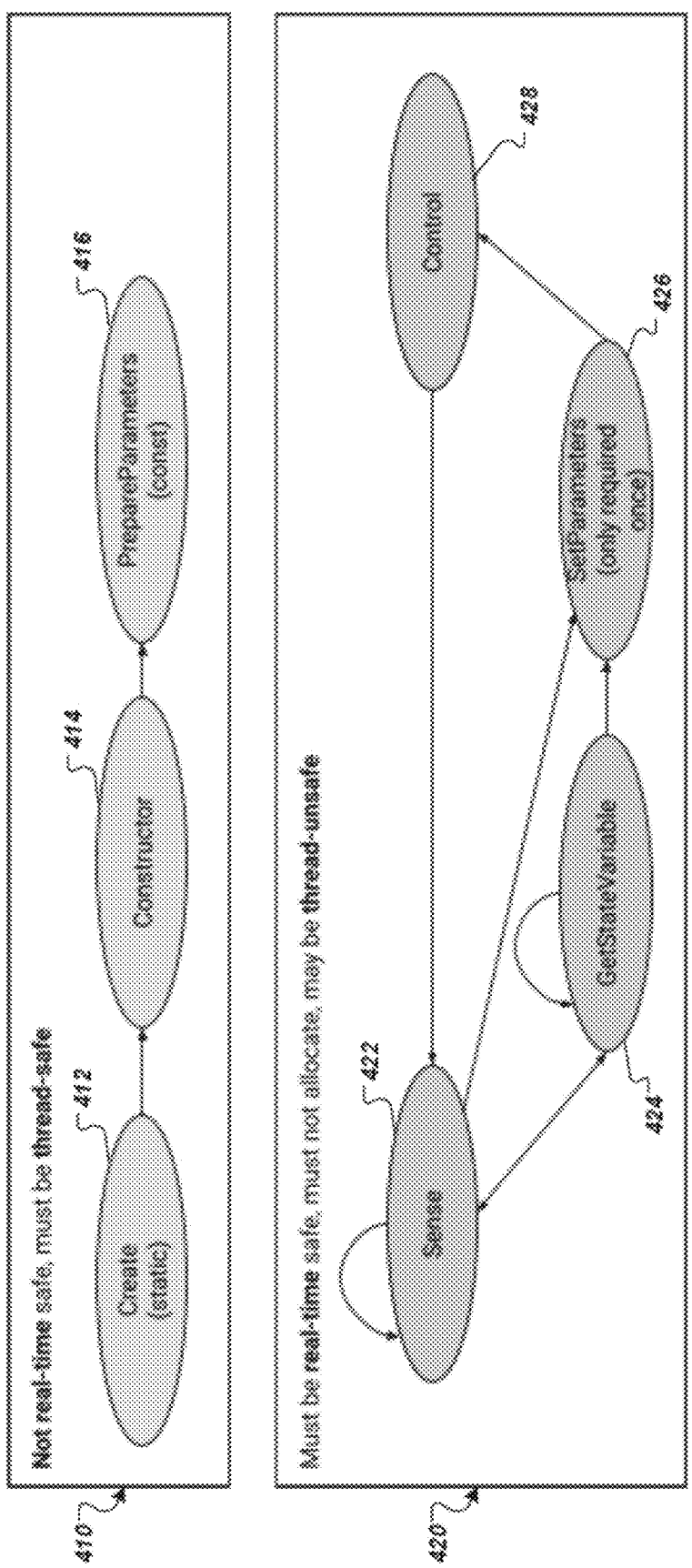
FIG. 4 illustrates the modules a user can define in order to implement custom real-time control code using the framework described in this specification.

FIG. 4 illustrates the modules a user can define in order to implement custom real-time control code using the framework described in this specification. The above examples described how a user can define custom real-time reactions for actions having precomputed motion parameters and sensor data that gets exposed by the underlying control system.

However, as mentioned above, the framework described in this specification can also allow a user to define custom real-time control code, which is executed in real-time on the server in order to compute motion parameters on the fly. In addition to giving the user the ability to precisely define how the motion parameters are computed in real-time, the framework also provides the user control over how the sensor data values are obtained, interpreted, and used.

At a high level, the modules are conceptually organized in two subgraphs that are executed in different domains. A first subgraph 410 represents the order of execution by a non-real-time thread of the control layer, e.g., by the non-real-time server 123*b*. Essentially, the first subgraph 410 shows how the framework prepares the execution environment to run the custom control code in real time. The functions defined in these modules are not required to be real-time safe, but some implementations require them to be thread-safe.

A second subgraph 420 represents the order of execution of the modules on each control tick of the real-time control cycle. The framework thus automatically executes these user-provided modules as a state machine in this order at each tick in the control cycle to implement custom real-time control. The second subgraph 420 can be completely executed in real-time from Sense to Control on each control cycle, unlike the real-time reaction state machines described above, which generally are executed over multiple ticks.

As indicated in FIG. 4, the modules of the second subgraph 420 are executed in one or more real-time threads and must therefore be real-time safe. They may optionally be thread-unsafe. In particular, the system can perform compile-time checks to ensure that the functions do not attempt operations with nondeterministic timing, such as allocating memory or performing network communications. The example modules shown in FIG. 4 can be written in any appropriate programming language, e.g., C++, Python, Lua, or Go, to name just a few examples.

In more detail, the first subgraph 410 includes non-real-time function calls between a static "Create" function 412, a Constructor 414 for a real-time action object, and a "PrepareParameters" function 416.

The Constructor 414 can be a program or class that creates an instance of the real-time action object when executed by the system. The real-time action object created by the Constructor 414 conforms to the concept of an object as defined by Object Oriented Programming (OOP), but in general will be an encapsulated representation of actions and data which may or may not inherit from or allow its action and data to be inherited by other objects. The concept of the Constructor 414 includes the Create function 412.

The framework can define a robot action class for every real-time robot behavior that uses a specific type of input, a specific type of output, a specific control law, or a combination thereof. Each real-time object can be responsible for controlling a concrete set of one or more moveable components, e.g., one or more joints of a robot. One real-time object can run all action instances for that action-part group combination. The real-time action object can be initialized based on a configuration for those moveable components, e.g., according to the number of degrees-of-freedom (DoF).

To start the process, the system can call the static Create function 412 to create a real-time action object. During this process, the Create function 412 can discover hardware interfaces or interfaces into higher layers of the control stack. For example, the Create function 412 can obtain feature interfaces for the real-time action object to read or control joint positions, compute inverse kinematics, or read joint velocity limits for a specific deployment.

The system can then call a Constructor 414 for the real-time action class to instantiate the real-time object and PrepareParameters 416 to prepare control parameters for real-time execution. Because these functions can be called from non-real-time threads, they can allocate memory dynamically and run arbitrarily long algorithms. In more detail, the "PrepareParameters" function 416 can be utilized to unpack generic control parameters, convert to real-time safe parameters, do extensive checking to verify whether parameters are within limits, and, when necessary, prepare inverse kinematic solutions. In particular, during execution of the real-time action, the system can make use of the "PrepareParameters" function to convert any non-real-time control parameters into real-time control parameters. For example, non-real-time control parameters can include different trajectory set points for a robot component, while real-time control parameters can relate to the actual levels of electrical current to be applied to robot motors and actuators at each point in time in order to effectuate the movements specified by the command.

During real-time execution, the system executes automatically executes the modules in the order shown by subgraph 420, which includes functions calls between four real-time functions: a "Sense" function 422, a "GetStateVariable" function 424, a "SetParameters" function 426, and a "Control" function 428.

In subgraph 420, the system can first utilize the "Sense" function 422 to read updated sensor values, e.g., the states and positions of the moveable components of the robots. The system can then utilize the "GetStateVariable" function 424 to retrieve updated state variables. The state variables, the choice of which may be user-specified, can include sensor values or information derived from the sensor values or both. For example, the state variables can include torque reading, velocity, position, or orientation of a robot component such as a joint. As another example, one state variable can characterize a progress of the robot toward completing a current action, e.g., distance to the goal position. The state variables may each be associated with one or more numeric values. In some cases, the "Sense" and "GetStateVariable" functions are each called once per control tick. In other cases, these functions are called multiple times during every control tick in order to facilitate action switch in the same control cycle.

The system can utilize the "SetParameters" function 426 to apply changes to values of control parameters that are real-time safe. The system can utilize the "Control" function to execute a custom control law and set new control points in the moveable components. The "SetParameters" and "Control" functions are typically called once per control tick.

Unlike the "Constructor" and "PrepareParameters" functions in subgraph 410, which are called from non-real-time threads and thus may allocate dynamically and run longer algorithms, the functions in subgraph 420 are called from a real-time thread and must be implemented real-time safe, e.g., by avoiding allocation and non-deterministic time computation. Regarding computation time, the "Control" function must complete within the period of the control tick, and the other real-time functions including "Sense" and "GetStateVariable" functions may need to execute substantially faster, as they may be called multiple times per control tick.

TABLE 4 includes an example of user code to define the modules illustrated in FIG. 4 to implement custom real-time control. In this simple example, the user code causes a joint to follow movement parameters that are computed in real-time according to the custom code as opposed to being precomputed. The resulting computations, when input into and executed by the framework, causes a robot joint to follow a sine wave by the fourth joint of a robot, and thus the real-time action class is named "SineWaveAction."

TABLE 4

```
1   # Create
2   absl::StatusOr<std::unique_ptr<SineWaveAction>>
3   SineWaveAction::Create (
4       ApplicationInterface& application_interface,
5       PartsInterface& parts_interface) {
6     ASSIGN_OR_RETURN (JointPosition & jpos,
7
8   parts_interface.GetUniqueInterface<JointPosition> ( ) ) ;
9       ASSIGN_OR_RETURN (JointPositionSensor & jsense,
10  parts_interface.GetUniqueInterface<JointPositionSenso
11  r> ( ) ) ;
12      ASSIGN_OR_RETURN (JointLimits & jlimits,
13
14  parts_interface.GetUniqueInterface<JointLimits> ( ) ) ;
15      return absl::make_unique<SineWaveAction> (jpos,
16  jsense, &jlimits,
17  application_interface.frequency ( ) ) ;
18  }
19
20
21  # Constructor
```

TABLE 4-continued

```
22   SineWaveAction::SineWaveAction (JointPosition&
23   joint position,
24                                   JointPositionSensor&
25   joint_position_sensor,
26                                   const JointLimits*
27   joint_limits,
28                                   double frequency_hz)
29     : joint_position_(joint_position) ,
30       joint_position_sensor_(joint_position_sensor) ,
31       frequency_hz_(frequency_hz) ,
32       limits_(*joint_limits) { }
33
34
35   # Prepare Parameters
36   absl::StatusOr<absl::any>
37   SineWaveAction::PrepareParameters (
38       const google::protobuf::Any& params) const {
39     ASSIGN_OR_RETURN (SineWaveActionInfo::FixedParams
40   fixed_params,
41
42   GetParam<SineWaveActionInfo::FixedParams> (params) ) ;
43     ASSIGN_OR_RETURN (Params command,
44   Params::FromProto (fixed_params) ) ;
45     return absl::make_any<Params> (command) ;
46   }
47
48   # Sense
51   RealtimeStatus SineWaveAction::Sense ( ) {
52     if (!initialized_) {
53       time_since_start_ = 0.0;
54       starting_position_ =
55   joint_position_sensor_.GetSensedPosition ( ) .position;
56       initialized_ = true;
57     } else {
58       time_since_start += 1.0 / frequency_hz_;
59     }
60     return OkStatus ( ) ;
61   }
62
63   # Control
64   RealtimeStatus SineWaveAction::Control ( ) {
65     eigenmath::VectorNd
66   sine_goal (starting_position_.size ( ) ) ;
67     for (size_t i = 0; i < starting_position_.size ( ) ;
68   + + i) {
69       double sine_value =
70         starting_position_(i) +
71         (command_.amplitudes [i] *
72         std::sin (time_since_start_ * 2. * M_PI *
73   command_.frequencies [i] ) ) ;
74       sine_goal (i) =
75         std::clamp (sine_value,
76   limits_.GetDefaultLimits ( ).min_position (i) ,
77
78   limits_.GetDefaultLimits ( ).max_position (i) ) ;
79     }
80     return
81   joint_position_.SetPositionSetpoints (sine_goal) ;
82   }
83
84   # Set Parameters
85   RealtimeStatus SineWaveAction::SetParameters(const
86   absl::any& any_params) {
87     const Params* params =
88   absl::any_cast<Params> (&any_params);
89     if (params == nullptr) {
90       return InvalidArgumentError (
91         "Parameters passed to SineWaveAction::Command
92   are not "
93         "SineWaveAction::Params.") ;
94     }
95     command_ = *params;
96     initialized_ = false;
97     return OkStatus ( ) ;
98   }
99
100  # Get State Variables
101  RealtimeStatusOr<StateVariableValue>
102  SineWaveAction::GetStateVariable (
103    absl::string_view name) const {
104    if (name == SineWaveActionInfo::kTime) {
105      return StateVariableValue (time_since_start_) ;
106    }
107    return
108    NotFoundError (FixedStrCat<RealtimeStatus::kMaxMessage
109  Length> (
110      "SineWaveAction, state variable not found " ,
111  name) ) ;
112  }
```

Referring back to the an example illustration of FIG. 4, the "SineWaveAction" constructor, "SineWaveAction::Create" function, and the "SineWaveAction::PrepareParameters" function collectively constitute the non-real-time subgraph 410.

And "SineWaveAction::Sense", "SineWaveAction::Control", "SineWaveAction::SetParameters", and "SineWaveAction::GetStateVariable" functions collectively constitute the real-time functions within subgraph 420.

During execution, "SineWaveAction::Sense" function can be used by the system to retrieve updated positions of the robot, the "SineWaveAction::GetStateVariable" function can be used to retrieve updated state variables, and the "SineWaveAction::SetParameters" function can be used to apply changes to values of control parameters, i.e., as a result of running the "SineWaveAction::Control" function.

Notably, "SineWaveAction::Control" function computes motion parameters in real-time according to user-provided code to achieve the sine wave movement action. The code within the "SineWaveAction::Control" function include user code that, once run, can compute real-time goal positions of the robot joint according to a sine wave control law and according to joint limits of the robot.

A number of use cases will now be described. As a particular example, the framework can provide a user with the capability to achieve custom real-time admittance control of one or more robots. Admittance control can be effective when a user wishes to regulate the interaction of a robot with the environment. For example, to execute a move-to-contact, contact manipulation, or contact-based interaction with an object, the real-time robotics control system can use the framework to read force or torque readings from a sensor that, for example, is placed at a robot tooltip, and control position or velocity of a robot arm in real-time.

As another particular example, the framework can provide a user with the capability to achieve custom real-time sensor-based control of one or more robots with a nominal path. For example, gluing, deburring, polishing or other tasks generally require a robot follow a continuous path, but when the part has variation or is freely placed or the cell is not precisely calibrated, the path currently followed by the robot arm needs modification, i.e., to adapt to the part. The adaptation must happen in the real-time control cycle using sensor input, for instance force and torque input from a sensor at the robot tooltip or from a visual distance sensor.

As another particular example, the framework can provide a user with the capability to control one or more robots by following a real-time custom control strategy. For example, custom control strategies for force-press, peg-in-the-hole or assembly tasks require controlling the robots to follow a custom control law, for instance an impedance controlled spiral motion with decreasing stiffness. In this example, the sensors may be torque sensors in the robot arm, but the control law is user-provided and is not part of the pre-configured robot control software.

Figure 5:
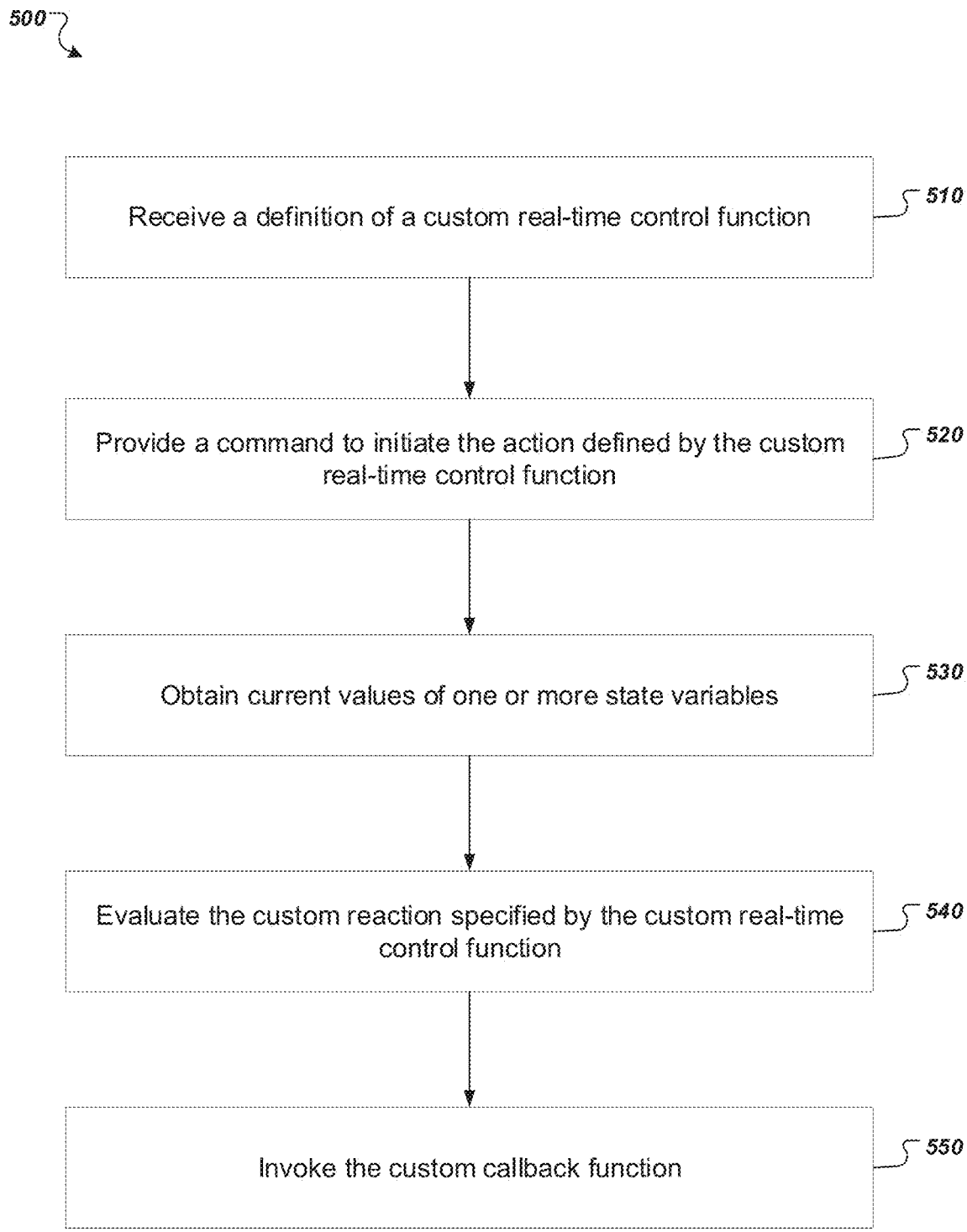
FIG. 5 is a flowchart of an example process for executing a custom real-time reaction that uses a callback function.

FIG. 5 is a flowchart of an example process 500 for executing a custom real-time reaction that uses a callback function. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

As described above, the system runs a real-time robotics control framework that is composed of a stack of multiple software modules which can be executed repeatedly in a predetermined sequence in order to control one or more robots. One of such software modules is an application module in the control stack that runs a custom real-time control function and generates commands, some or all of which may be non-real-time commands, for one or more robots. Another such software module is a bridging module in the control stack that translates each non-real-time command into data that can be consumed by real-time controllers that are responsible for generating low-level real-time commands to control the one or more robots to perform a custom action.

The system receives a definition of a custom real-time control function (510). The custom real-time control function can specify a custom callback function, an action, and a custom reaction that references the custom callback function. The custom reaction can include one or more conditions for triggering a real-time robotics control cycle to invoke the custom callback function.

As similarly described above with reference to FIG. 2, the custom real-time control function can be provided by a different entity than an entity running or providing the real-time robotics control framework. For example, the system can receive, from a user of the system, custom real-time control code that defines the custom callback function, e.g., in addition to the user code received at step 210 of FIG. 2 that defines the sequence of actions to be executed with deterministic timing and one or more custom reactions that chain the sequence of actions. Once received, the custom real-time control code can run at the application layer of the real-time robotics control framework.

Unlike the actions defined by the custom real-time control function that are required to be executed with deterministic timing, the custom callback function can implement control logics or other computations with arbitrary complexity that, when triggered for execution, some of which may not preserve the real-time guarantees of the system. By virtue of asynchronous programming, however, the execution of the custom callback function at the application layer does not obstruct the system from maintaining the custom real-time control of the robot. This gives the system additional capability to support a range of different tasks, including time intensive tasks that would otherwise be impossible because of the tight timing constraints.

The system initiates the action defined by the custom real-time control function (520). That is, the system begins controlling the robot to execute the action. To kick off the execution of the action, the system can run the software modules within the application layer to provide a start command to the non-real-time server within the control layer of the framework. For example, the action can be a first, custom real-time action in the real-time state machine specified by the user code provided to the system.

The system repeatedly executes, by using the control layer of the real-time robotics control framework, the custom real-time control function at each predetermined control tick of the real-time robotic control system driving one or more physical robots. For example, the system can repeatedly execute the custom real-time control function at each control tick of the system in accordance with a control schedule that has been determined in advance, e.g., following the commencement of the execution of the real-time control function. In brief, this involves obtaining current values of one or more state variables (530), evaluating the custom reaction specified by the custom real-time control function according to the current values of the one or more state variables (540) and, whenever the one or more conditions of the custom reaction are satisfied, invoking the custom callback function (550).

As described above, the control layer in turn can include a non-real-time server that, during execution, runs a non-real-time thread configured to communicate with the application layer, and a real-time control layer that, during execution, runs a real-time thread configured to drive the robot along the real-time robotics control cycle by interfacing with the hardware abstraction layer.

The system obtains current values of one or more state variables (530) while executing the action defined by the custom real-time control function. As described above with reference to FIG. 2, the state variable can generally include sensor values or information derived from the sensor values or both.

The system evaluates the custom reaction specified by the custom real-time control function according to the current values of the one or more state variables (540) and, whenever the one or more conditions of the custom reaction are satisfied, the system invokes the custom callback function (550).

Alternatively, if no custom reaction is satisfied, the system continues to execute a next control tick of the current action. That is, the process 500 returns to step 530 where the system obtains new values of the one or more state variables.

To invoke the custom callback function, the real-time thread running at the real-time control layer can provide, to the non-real-time thread running at the non-real-time server, a notification that the custom callback function should be invoked. The non-real-time thread can then provide, to the application layer of the framework, a notification that the custom callback function should be invoked. In response to receiving the notification from the non-real-time thread, the application layer of the framework, can execute the custom callback function in the application layer of the framework.

Figure 6:
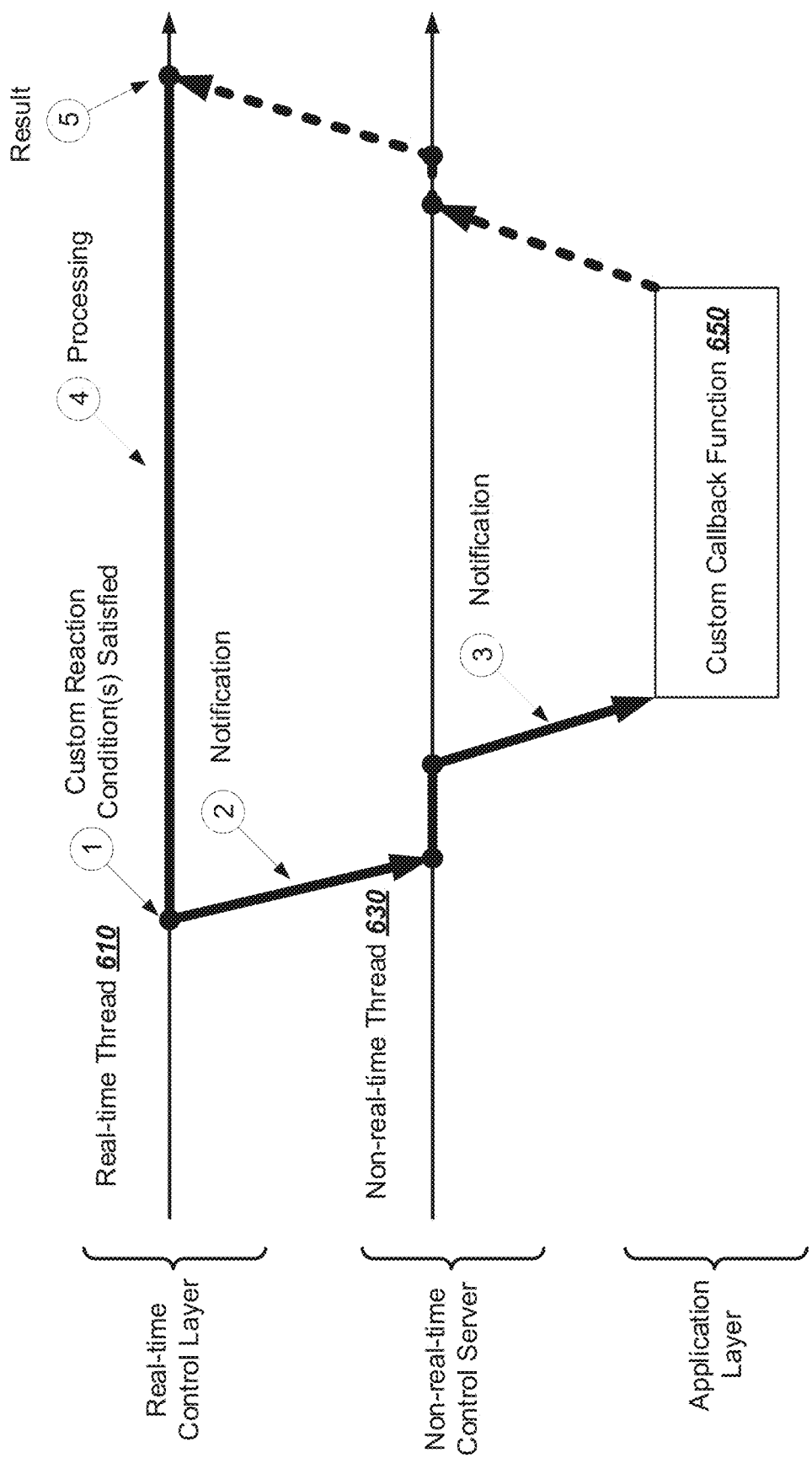
FIG. 6 is an example illustration of execution trace for a custom real-time reaction that uses a callback function.

This is illustrated in FIG. 6, which graphically shows an example execution trace for a custom real-time reaction that uses a callback function. In FIG. 6, the horizontal line segments indicate time spent in thread execution, while arrows between line segments indicate causal relationships between threads, e.g., in the form of notifications. As illustrated, the application-level code and the custom real-time control code are processed an asynchronous manner.

In response to determining that the one or more conditions of the custom reaction are satisfied (1), the real-time thread 610 provides a notification (2) to the non-real-time thread 630. Next, the non-real-time thread 630 provide a notification (3) to the application layer, which then begins execution of the custom callback function 650. In the meantime, the real-time thread 610 continues to process the custom real-time control code (4). In cases where the custom callback function generates a computation or execution result, it can return such a result to the real-time control layer (5) whenever the execution of the custom callback function is completed, i.e., at any time point after the notification to the non-real-time thread 630 to invoke the custom callback function is made and while the real-time thread 610 is still processing the custom real-time control code.

In general, a callback function is a pointer to the executable code that is passed as an argument to another function. Thus invoking the custom callback function can involve providing one or more elements of real-time data used by the real-time thread as arguments to the custom callback function.

In more detail, in some implementations, the system can do this by writing the one or more elements of real-time data to a memory location accessible by the non-real-time thread of the control layer; reading, by using the non-real-time thread, updated values at the memory location; and providing, by using the non-real-time thread to the application layer, the updated values written by the real-time thread to the memory location.

For example, the elements of real-time data include a time stamp representing when the one or more conditions of the custom reaction were satisfied in the real-time thread. As another example, the elements of real-time data include an identification of a previous action executed before the custom reaction was satisfied. As yet another example, the elements of real-time data include an identification of a current action that triggered the custom reaction.

TABLE 5 includes an example of user code written to define a callback function.

TABLE 5

| 1 | def handle_event (timestamp, previous_action_id, |
| 2 | current_action_id) : print ('Almost there!') |
| 3 | |
| 4 | action0 = session.add_action ( |
| 5 | action_id=0, |
| 6 | action_type='point_to_point_move', |
| 7 | params=move_params, |
| 8 | reactions= [ |
| 9 | Reaction ( |
| 10 | condition= |
| 11 | Condition.is_less_than ('distance to goal' , |
| 12 | 0.25), |
| 13 | responses= [ |
| 14 | TriggerCallback (handle_event) , |
| 15 | ] ) |
| 16 | ] ) |
| 17 | session.start_action (action0.id) |

The example user code is client-side code that can be executed by the client of a real-time robotic control system in response to an event where a robot component, e.g., a robot arm, has moved within a threshold distance of 25 cm of a goal position.

On line 1, a callback function is defined. In this case, the callback function is simply to print out the text of "Almost there!" for example, at the client device 190. In practice, the callback functions are typically much more complex, some of which may generate a computation or execution result and return such a result back to the calling thread.

On line 4, an action is defined. The action definition includes an id (line 5), a type (line 6), and movement parameters (line 7).

As shown on lines 8-16, the action has a reaction that specifies a condition and a response. In this case, the condition is whether or not the robot component has moved within a threshold distance of 25 cm of a goal position, and the response is to invoke the callback function (at line 14).

On line 17, the client kicks off the real-time action by sending a command to the non-real-time server, referencing the action id. The control layer of the system will then initialize the real-time environment and execute the action accordingly, including invoking the callback function whenever the condition is satisfied.

Figure 7:
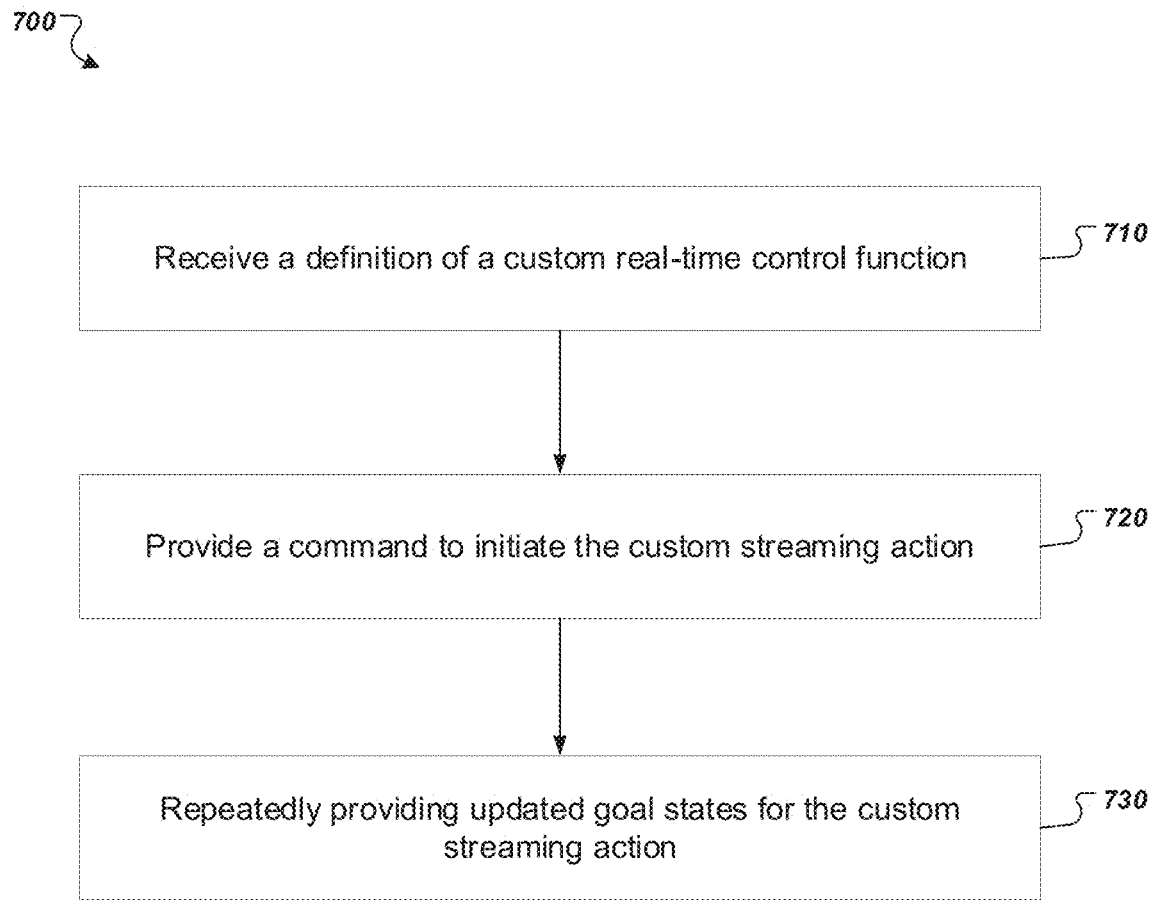
FIG. 7 is a flowchart of an example process for executing a custom action that uses streaming inputs.

FIG. 7 is a flowchart of an example process 700 for executing a custom action that uses streaming inputs. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

As described above, the system runs a real-time robotics control framework that is composed of a stack of multiple software modules which can be executed repeatedly in a predetermined sequence in order to control one or more robots. One of such software modules is an application module in the control stack that runs a custom real-time control function and generates commands, some or all of which may be non-real-time commands, for one or more robots. Another such software module is a bridging module in the control stack that translates each non-real-time command into data that can be consumed by real-time controllers that are responsible for generating low-level real-time commands to control the one or more robots to perform a custom action.

The system receives a definition of a custom real-time streaming control function (710). The custom real-time streaming control function can define a custom action that uses streaming inputs ("a custom streaming action"). Streaming inputs are real-time inputs that may arrive at varying rates or non-deterministically, e.g., with incomplete information, or both. The custom streaming action can specify a goal state for a robot in an operating environment. For example, the goal state can be defined in terms of position, velocity, acceleration, joint angle, or a combination thereof of the robot.

The custom real-time streaming control function can include a function that defines custom handling of gaps between streaming inputs, e.g., between receiving a current goal state and any updated goal state from the application layer. For example, the custom real-time streaming control function can include a user-defined interpolation or extrapolation function to compute the goal states for the robot. As another example, the custom real-time streaming control function can a function call to a user-selected function, i.e., a function selected from a library of pre-defined interpolation or extrapolation functions, to compute the goal states for the robot.

As similarly described above with reference to FIG. 2, the custom real-time streaming control function can be provided by a different entity than an entity running or providing the real-time robotics control framework. For example, the system can receive, from a user of the system, custom real-time streaming control code that defines the custom real-time streaming control function, e.g., in addition to the user code received at step 210 of FIG. 2 that defines the sequence of actions to be executed with deterministic timing and one or more custom reactions that chain the sequence of actions. Once received, the custom real-time streaming control code can run at the application layer of the real-time robotics control framework.

The system initiates the custom streaming action defined by the custom real-time streaming control function (720). That is, the system begins controlling the robot to execute the custom streaming action. To kick off the execution of the custom streaming action, the system can run the software modules within the application layer to provide a start command to the non-real-time server within the control layer of the framework. For example, the custom streaming action can be a custom real-time action in the user-specified real-time state machine that uses one or more streaming inputs.

The system repeatedly provides updated goal states for the custom streaming action to the control layer of the real-time robotics control framework (730). The system can do this by running the custom real-time streaming control function at the application layer of the framework.

In response to receiving the updated goal states, the control layer is configured to execute the custom streaming action including driving the robot toward a most recent goal state at each predetermined tick of a real-time robotics control cycle. For example, the control layer can repeatedly execute the custom streaming action at each control tick of the system in accordance with a control schedule that has been determined in advance, e.g., following the commencement of the execution of the custom streaming action.

In various cases, a first rate at which the application layer provides updated goal states to the control layer is different than a second rate of the real-time robotics control cycle. For example, the first rate is a user-defined time period specified in the custom real-time streaming control function that is lower, sometimes much lower, than the second rate of the real-time robotics control cycle.

In these cases, to effectuate the real-time guarantees of the system, the control layer is additionally configured to drive the robot toward the most recent goal state during one or more additional ticks of the real-time robotics control cycle before receiving any additional updated goal states from the application layer.

To do so, the non-real-time server of the control layer which is running as a non-real-time thread can receive an updated goal state from the application layer and select a current or future tick of the real-time robotics control cycle at which to provide the updated goal state to the real-time control layer of the control layer which is running as a real-time thread. This allows for the real-time control layer to mitigate the impact of any jitter from the streaming inputs.

Figure 8:
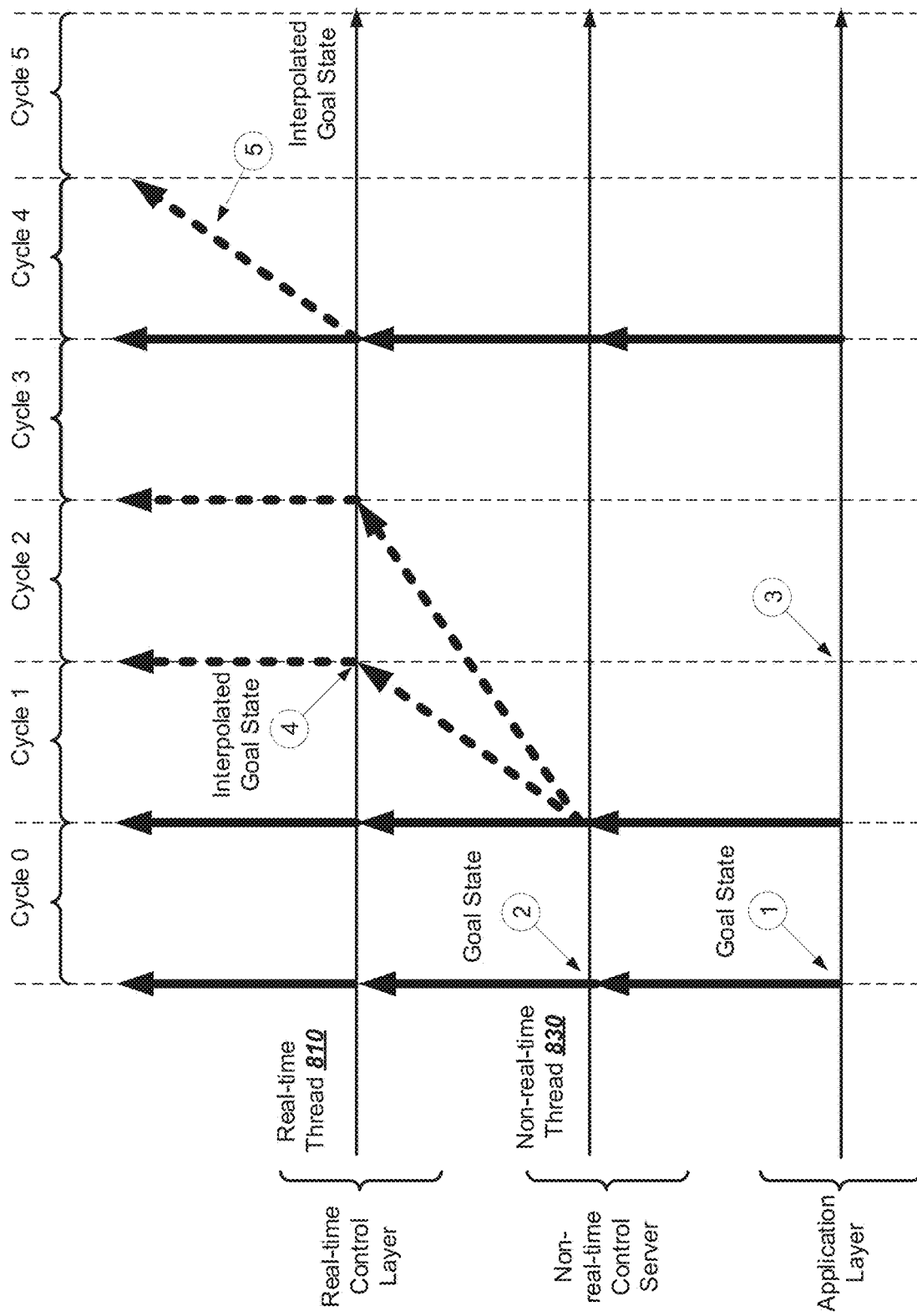
FIG. 8 is an example illustration of execution trace for a custom real-time reaction that uses a streaming inputs.

This is illustrated in FIG. 8, which graphically shows an example execution trace for a custom real-time reaction that uses streaming inputs. FIG. 8 shows a total of 5 real-time robotics control cycles beginning with "cycle 0." The upward pointing arrows between the horizontal line segments indicate control inputs, e.g., goal states of a robot, being transmitted between two threads. As illustrated, the control inputs are streaming inputs because the application layer does not provide a goal state of the robot to the control layer (which in turn includes the real-time control layer and the non-real-time control server) at every tick of the real-time robotics control cycles. For example, no goal states arrive at the non-real-time thread 830 at the ticks of "cycle 2," "cycle 3," and "cycle 5."

At each tick of the control cycle, e.g., at "cycle 0," where a control input including an updated goal state of the robot provided by the application layer (1) is received at the non-real-time thread 830, the non-real-time thread 830 provides the updated goal state of the robot (2) to the real-time thread 810 such that the control layer drives the robot toward the updated goal state.

At each tick of the control cycle, e.g., at "cycle 2," where no control input including any updated goal state of the robot provided by the application layer (3) is received at the non-real-time thread 830, the non-real-time thread 830 that runs at the non-real-time control server can select a current or future tick of the control cycle at which to provide an interpolated goal state received from the application layer to the real-time thread. In particular, the interpolated goal state can be provided by either the non-real-time thread 830 or the real-time thread 810 to the real-time hardware abstraction layer. For example, at "cycle 2," the non-real-time thread 830 provides, as an updated goal state of the robot, an interpolated goal state (4) through the real-time control layer to the real-time hardware abstraction layer such that the system drives the robot toward the most recent goal state. As another example, at "cycle 5," the real-time thread 810 provides, as an updated goal state of the robot, an interpolated goal state (5) to the real-time hardware abstraction layer.

As described above, the way by which the interpolated goal states is generated can be a user-selectable option. For example, the non-real-time thread 830 (or the real-time thread 810) can repeatedly use the most recent goal state received from the application layer as the interpolated goal state, i.e., until receiving any additional goal states from the application layer (or from the non-real-time thread 830). As another example, the non-real-time thread 830 (or the real-time thread 810) can compute the interpolated goal states by running some custom interpolation or extrapolation function based on one or more most recent goal states received from the application layer (or from the non-real-time thread 830).

TABLE 6 includes an example of user code written to define a custom real-time streaming control function. This example uses a custom interpolation function to compute interpolated goal states for a six degree-of-freedom robot. The goal states include goal positions and goal velocities for each of the six joints of the robot.

TABLE 6

```
1     zero_joints = [0, 0, 0, 0, 0, 0, 0]
2     goal_joints = [0.4, -1.5, -.5, 0.5, 0.5, 0, 0]
3
4     # Add a streaming action.
5     streaming_joint_position_params =
6
7     streaming_joint_position_pb2.StreamingJointPositionCom
8     mand (
9         goal_position=joint_space_pb2.JointVec (joints=zero_joi
10    nts) ,
11
12        goal_velocity=joint_space_pb2.JointVec (joints=zero_joi
13    nts) )
14        streaming_action = session.add action (
15            action_id=1,
16            action_type="streaming_joint_position_move"
17            params=streaming_joint_position_params,
18            reactions= [ ] )
19
20    # Open a stream to the action.
21    stream = session.open_stream (
22    action_id=streaming_action.id,
23    field_name='streaming-position-command')
24    logging.info ('Starting the streaming motion.')
25    # Start the action.
26    session.start_action (action_id=streaming_action.id)
27
28    # Interpolate towards the goal position.
29    num_steps = 240
30    f = scipy.interpolate.interp1d( [0, num_steps - 1] ,
31        np.vstack ( [zero_joints, goal_joints] ) , axis=0)
32
33    # Stream the joint values towards the goal.
```

TABLE 6-continued

```
34      for step in range (num_steps):
35          msg =
36          streaming_joint_position_pb2.StreamingJointPositionCom
37          mand (
38              goal_position=joint_space_pb2.JointVec (joints=f (step) )
39          )
40          stream.write (msg)
            time.sleep (0.01)
```

Lines 5-12 show that the movement parameters are streaming parameters.

On line 13, a streaming action is defined. The streaming action definition includes an id (line 14), a type (line 15), and the streaming movement parameters (line 16). Line 17 shows that there are no reactions associated with this streaming action.

On line 19, a connection to the server is initiated to prepare the server for streaming. On line 24, the client kicks off the streaming action by sending a command to the non-real-time server, referencing the action id. The control layer of the system will then initialize the real-time environment and execute the streaming action accordingly. Lines 27-38 shows how to use an example 1-D interpolation function to find the values of new goal positions for the joints of the robot.

On line 32: a loop for use in repeatedly feeding in the next value using the "stream.write" function is defined.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving, by an application layer of a real-time robotics control framework, a definition of a custom real-time control function that specifies a custom callback function, an action, and a custom reaction that references the custom callback function, wherein the custom reaction comprises one or more conditions for triggering a real-time robotics control cycle to invoke the custom callback function;
  providing, by the application layer to a control layer of the framework, a command to initiate the action defined by the custom real-time control function;
  repeatedly executing, by the control layer of the real-time robotics control framework, the custom real-time control function at each predetermined tick of a real-time robotics system driving one or more physical robots, including:
    obtaining current values of one or more state variables,
    evaluating the custom reaction specified by the custom real-time control function according to the current values of the one or more state variables, and
    whenever the one or more conditions of the custom reaction are satisfied, invoking, in the application layer of the real-time robotics control framework, the custom callback function.

Embodiment 2 is the method of embodiment 1, wherein the control layer comprises:
  a non-real-time thread that is configured to communicate with the application layer; and
  a real-time thread that is configured to drive the robot along the real-time robotics control cycle.

Embodiment 3 is the method of embodiment 2, wherein invoking the custom callback function comprises:
  providing, by the real-time thread to the non-real-time thread, a notification that the custom callback function should be invoked,
  providing, by the non-real-time thread to the application layer of the framework, a notification that the custom callback function should be invoked,
  receiving, by the application layer of the framework, the notification from the non-real-time thread, and
  in response, executing the custom callback function in the application layer of the framework.

Embodiment 4 is the method of any one of embodiments 2-3, wherein invoking the custom callback function comprises providing one or more elements of real-time data used by the real-time thread as arguments to the custom callback function.

Embodiment 5 is the method of embodiment 4, wherein the one or more elements of real-time data comprise a time stamp representing when the one or more conditions of the custom reaction were satisfied in the real-time thread.

Embodiment 6 is the method of embodiment 4, wherein the one or more elements of real-time data comprise an identification of a previous action executed before the custom reaction was satisfied.

Embodiment 7 is the method of any one of embodiments 4-6, wherein the one or more elements of real-time data comprise an identification of a current action that triggered the custom reaction.

Embodiment 8 is the method of any one of embodiments 4-7, wherein the providing one or more elements of real-time data used by the real-time thread as arguments to the custom callback function comprises:

writing the one or more elements of real-time data to a memory location accessible by the non-real-time thread of the control layer;

reading, by the non-real-time thread, updated values at the memory location; and providing, by the non-real-time thread to the application layer, the updated values written by the real-time thread to the memory location.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving, by a non-real-time application layer of a real-time robotics control framework, a definition of a custom real-time control function that specifies a custom callback function, an action, and a custom reaction that references the custom callback function, wherein the custom reaction comprises one or more conditions for triggering a real-time robotics control cycle to invoke the custom callback function;

providing, by the non-real-time application layer to a real-time control layer of the real-time robotics control framework, a command to initiate the action defined by the custom real-time control function;

repeatedly executing, by the real-time control layer of the real-time robotics control framework, the custom real-time control function at each predetermined tick of a real-time robotics system driving one or more physical robots, including:

obtaining current values of one or more state variables, evaluating the custom reaction specified by the custom real-time control function according to the current values of the one or more state variables, whenever the one or more conditions of the custom reaction are satisfied, invoking, from the real-time control layer and to the non-real-time application layer of the real-time robotics control framework, the custom callback function, wherein invoking the custom callback function comprises providing a current action of a real-time thread executing at the real-time control layer as an argument to the custom callback function, and in response, executing the custom callback function in the non-real-time application layer of the framework.

2. The method of claim 1, wherein the real-time control layer comprises:

a non-real-time thread that is configured to communicate with the application layer; and the real-time thread that is configured to drive the robot along the real-time robotics control cycle.

3. The method of claim 2, wherein invoking the custom callback function comprises:

providing, by the real-time thread to the non-real-time thread, a notification that the custom callback function should be invoked, providing, by the non-real-time thread to the application layer of the framework, a notification that the custom callback function should be invoked, and receiving, by the application layer of the framework, the notification from the non-real-time thread.

4. The method of claim 1, wherein invoking the custom callback function comprises providing a time stamp representing when the one or more conditions of the custom reaction were satisfied in the real-time thread as an argument to the custom callback function.

5. The method of claim 1, wherein invoking the custom callback function comprises providing an identification of a previous action executed before the custom reaction was satisfied as an argument to the custom callback function.

6. The method of claim 1, wherein invoking the custom callback function comprises:

writing updated values to a memory location accessible by the non-real-time thread of the control layer;

reading, by the non-real-time thread, the updated values at the memory location; and providing, by the non-real-time thread to the application layer, the updated values written by the real-time thread to the memory location.

7. A system comprising one or more computers and one or more storage devices storing instructions that when executed by the one or more computers cause the one or more computers to perform operations comprising:

receiving, by a non-real-time application layer of a real-time robotics control framework, a definition of a custom real-time control function that specifies a custom callback function, an action, and a custom reaction that references the custom callback function, wherein the custom reaction comprises one or more conditions for triggering a real-time robotics control cycle to invoke the custom callback function;

providing, by the non-real-time application layer to a real-time control layer of the real-time robotics control framework, a command to initiate the action defined by the custom real-time control function;

repeatedly executing, by the real-time control layer of the real-time robotics control framework, the custom real-time control function at each predetermined tick of a real-time robotics system driving one or more physical robots, including:

obtaining current values of one or more state variables, evaluating the custom reaction specified by the custom real-time control function according to the current values of the one or more state variables, whenever the one or more conditions of the custom reaction are satisfied, invoking, from the real-time control layer and to the non-real-time application layer of the real-time robotics control framework, the custom callback function, wherein invoking the custom callback function comprises providing a current action of a real-time thread executing at the real-time control layer as an argument to the custom callback function, and in response, executing the custom callback function in the non-real-time application layer of the framework.

8. The system of claim 7, wherein the real-time control layer comprises:
   a non-real-time thread that is configured to communicate with the application layer; and
   the real-time thread that is configured to drive the robot along the real-time robotics control cycle.

9. The system of claim 8, wherein invoking the custom callback function comprises:
   providing, by the real-time thread to the non-real-time thread, a notification that the custom callback function should be invoked,
   providing, by the non-real-time thread to the application layer of the framework, a notification that the custom callback function should be invoked, and
   receiving, by the application layer of the framework, the notification from the non-real-time thread.

10. The system of claim 7, wherein invoking the custom callback function comprises providing a time stamp representing when the one or more conditions of the custom reaction were satisfied in the real-time thread as an argument to the custom callback function.

11. The system of claim 7, wherein invoking the custom callback function comprises providing an identification of a previous action executed before the custom reaction was satisfied as an argument to the custom callback function.

12. The system of claim 7, wherein invoking the custom callback function comprises:
   writing updated values to a memory location accessible by the non-real-time thread of the control layer;
   reading, by the non-real-time thread, the updated values at the memory location; and
   providing, by the non-real-time thread to the application layer, the updated values written by the real-time thread to the memory location.

13. One or more non-transitory computer-readable storage media storing instructions that when executed by one or more computers cause the one or more computers to perform operations comprising:

receiving, by a non-real-time application layer of a real-time robotics control framework, a definition of a custom real-time control function that specifies a custom callback function, an action, and a custom reaction that references the custom callback function, wherein the custom reaction comprises one or more conditions for triggering a real-time robotics control cycle to invoke the custom callback function;

providing, by the non-real-time application layer to a real-time control layer of the real-time robotics control framework, a command to initiate the action defined by the custom real-time control function;

repeatedly executing, by the real-time control layer of the real-time robotics control framework, the custom real-time control function at each predetermined tick of a real-time robotics system driving one or more physical robots, including:

obtaining current values of one or more state variables, evaluating the custom reaction specified by the custom real-time control function according to the current values of the one or more state variables, whenever the one or more conditions of the custom reaction are satisfied, invoking, from the real-time control layer and to the non-real-time application layer of the real-time robotics control framework, the custom callback function, wherein invoking the custom callback function comprises providing a current action of a real-time thread executing at the real-time control layer as an argument to the custom callback function, and in response, executing the custom callback function in the non-real-time application layer of the framework.

14. The computer-readable storage media of claim 13, wherein the real-time control layer comprises:
   a non-real-time thread that is configured to communicate with the application layer; and
   the real-time thread that is configured to drive the robot along the real-time robotics control cycle.

15. The computer-readable storage media of claim 14, wherein invoking the custom callback function comprises:
   providing, by the real-time thread to the non-real-time thread, a notification that the custom callback function should be invoked,
   providing, by the non-real-time thread to the application layer of the framework, a notification that the custom callback function should be invoked, and
   receiving, by the application layer of the framework, the notification from the non-real-time thread.

* * * * *